Patented Oct. 9, 1934

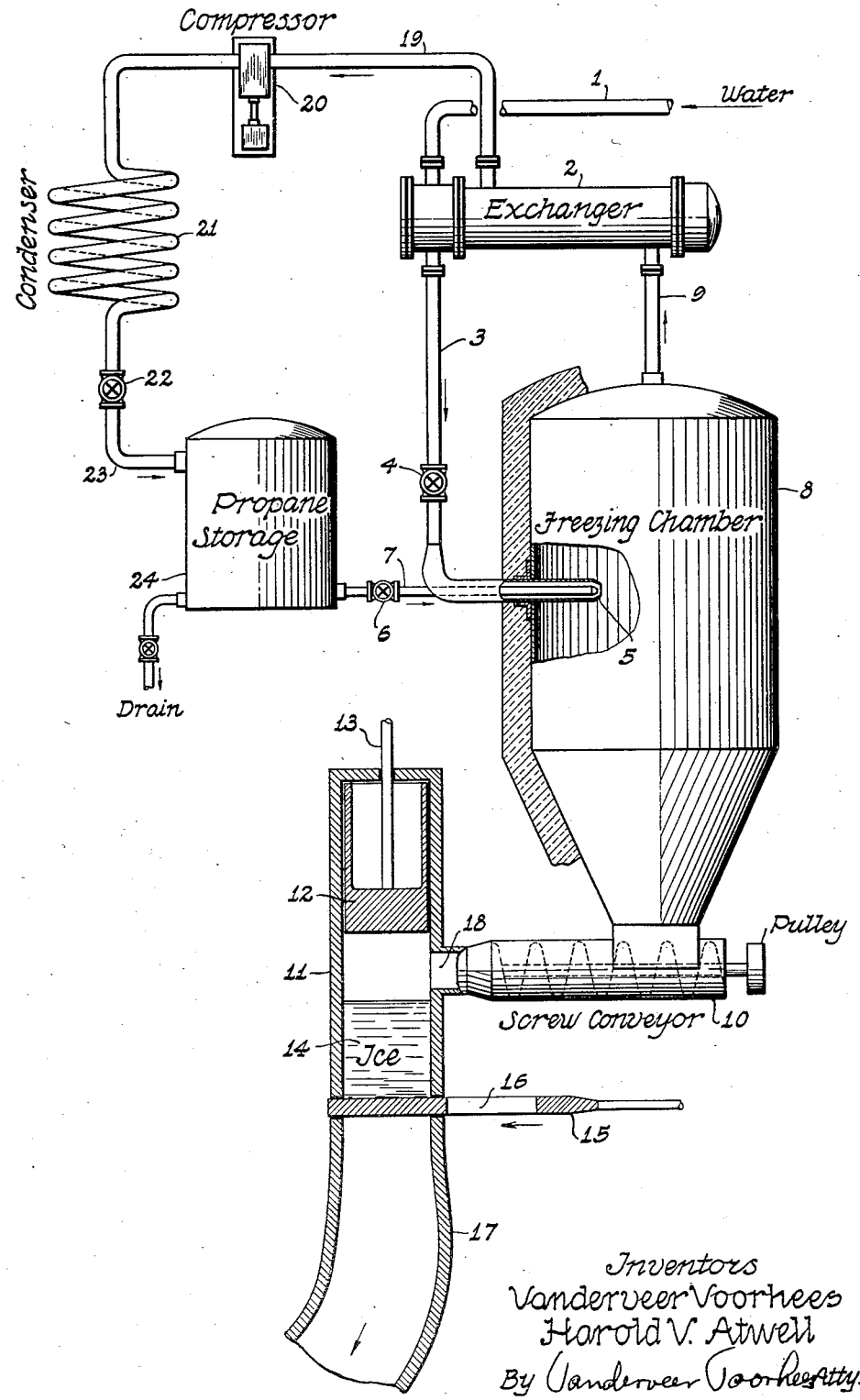

1,976,204

UNITED STATES PATENT OFFICE 1,976,204

PROCESS OF MAKING ICE

Vanderveer Voorhees, Hammond, Ind., and Harold V. Atwell, Bayside, N. Y., assignors to Standard Oil Company, Chicago, Ill., a corporation of Indiana Application January 8, 1932, Serial No. 585,468

5 Claims. (Cl. 62—172)

This invention relates to a process of freezing water to make industrial ice and more particularly to a process of freezing water instantaneously by means of direct contact between the water and the refrigerant.

One of the objects of the invention is to reduce refrigeration losses in the manufacture of ice by reducing the time required in the freezing process and also by reducing the size of the apparatus required to produce a given tonnage output of ice.

Another object is to produce ice in a new form, more attractive in appearance and less fragile than ice produced by slow freezing of water in tanks.

Another object is to manufacture ice from water containing traces of dissolved salts without concentrating them in a small portion of the finished product and without the necessity of resorting to the expensive process of removing the salts from the water.

Another object is to produce ice suitable for use in foods and beverages having the natural flavor of potable waters. Ice made from distilled water has a characteristic disagreeable taste, largely because of the absence of the natural salts such as salts of calcium, magnesium, sodium, and iron. This objection applies also to a lesser extent to ice made by slow cooling wherein the salts are "frozen out" of the ice and the result is a product relatively free from natural salts and having an impaired taste.

Other advantages of our invention will become apparent from the following description.

The apparatus employed for carrying out our invention as illustrated in the accompanying drawing, partly in diagram and partly in elevation. The following description of the apparatus and the process will serve to clarify the invention and the method of carrying out the process. Water, obtained from any suitable source of relatively pure water, for example, natural potable water or filtered or chemically treated water from a municipal water supply system is introduced by line 1 into heat exchanger 2, whereby it is substantially cooled to a temperature of approximately 40 to 60° F. The cooled water leaving exchanger 2 then passes through line 3 and valve 4 into spray nozzle 5 extending into freezing chamber 8 where it is brought into contact with a stream of the refrigerant admitted through valve 6 and line 7. The refrigerant is preferably maintained under pressure to the point where it meets the stream of water from line 3. The high velocity of the refrigerant escaping from line 7 into nozzle 5 causes the water to be atomized into minute particles, with the result that a fine spray of water particles and liquid refrigerant particles is produced in the freezing chamber 8.

Freezing chamber 8 is maintained under a relatively low pressure by continuously withdrawing therefrom vapors of refrigerant through line 9 leading to heat exchanger 2. As a result of the intimate contact between the particles of refrigerant and the particles of water, the water is continuously frozen into fine particles of ice or snow. The snow falls to the bottom of the chamber and is collected by conveyor 10 which may be of any suitable design, but is preferably of the rotating worm type. The snow is partially compressed and carried by the conveyor into block machine 11 where it is finally consolidated under high pressure by the impact of plunger 12, actuated by rod 13 and a suitable driving mechanism not shown. It is preferred to use pressures of sufficient magnitude to produce a block of ice having a density between 0.85 and 0.9, altho ice of lower density may be manufactured for certain uses. When the block of snow, indicated at 14, has reached the desired size, the bottom of the compression chamber 11 is opened by moving slide 15 in the direction indicated by the arrow to a position where the port 16 registers with the chamber 11. The necessary movement of the plunger 12 serves to discharge the block of ice 14 from the chamber into discharge chute 17, from where it may be delivered to any place desired, for example, to an insulated storage room. Slide 15 is thereupon returned to its original position and the block machine is ready to form the next block. It will be observed from the drawing that the plunger 12 is constructed with sufficient length to extend over the port 18 when in the extreme downward position. Thus, the supply of snow from conveyor 10 is automatically cut off during the block discharging operation.

Refrigerant vapors from the freezing chamber pass through line 9 into exchanger 2 where they absorb a part of the heat of the incoming water by indirect contact therewith. The vapors then pass through line 19 into compressor 20 where they are compressed to a pressure suitable for liquefaction in condenser 21. This pressure will vary depending on the particular refrigerant used, but will ordinarily lie between 25 and 200 pounds per square inch. The condensed vapor leaves condenser 21 by valve 22 and line 23 to storage reservoir 24 from which the refrigerant is again supplied by line 7 controlled by valve 6 to the freezing chamber 8.

We have found that the success of this process of manufacturing ice is intimately dependent on the selection of a refrigerant having certain essential properties. Refrigerants of the common type, such as ammonia and sulfur dioxide, are entirely unsuitable, largely for the reason of their solubility in water and contamination of the ice product. We have further found that many other common refrigerants cannot be used, either because of their water solubility or their dangerous toxic properties. We have discovered that liquefied hydrocarbon gases are particularly suitable for carrying out our process of freezing water by direct contact with the refrigerant. As examples of these refrigerants, we may employ propane, butane, iso-butane, butylene, ethane, propylene, etc. Of these compounds, we prefer to use propane, largely because of convenience in handling.

In addition to preventing the contamination of the ice product by the use of inert substantially insoluble refrigerant gases applicants' process completely freezes all the water in the freezing chamber, leaving no liquid water in contact with the refrigerant. Inasmuch as the solubility of these refrigerant gases is considerably less in ice than in water applicants' product contains substantially no refrigerant gas except what little may be occluded among the ice crystals and this residual vapor is substantially all expelled by the compression of the product in the block forming machine as will be referred to hereinafter.

The product produced by our process is entirely unlike manufactured ice made heretofore. It is brilliant white and translucent in appearance and velvety in texture. It has considerably greater strength than transparent ice, particularly with respect to resistance to fracture. This property enables it to be handled and distributed with a considerable reduction in handling loss. Because of the high pressure employed in its manufacture, any residual hydrocarbon vapors remaining in the snow are almost completely expelled from the product. The slight trace of hydrocarbon vapor which does remain is unobjectionable for all ordinary uses, such as domestic refrigeration, use in the preparation of food stuffs, cold drinks, etc.

Any trace of salts, hardness or other material in the water remains uniformly distributed throughout the product and has no adverse effect on the appearance thereof. In fact, it is possible by our process to introduce a trace of an edible dyestuff into the water, before freezing, whereby the product may be tinted to produce any desired color effect. Methylene blue or saffron green can be used for this purpose and assist in identifying our new product. We contemplate the use of colors in this manner as an important part of our invention.

We have found that our process of freezing water by direct contact with a refrigerant results in enormous savings in refrigeration expense. We believe this is mostly due to the avoidance of heat transfer through many surfaces and the elimination of intermediate cooling agents such as brine, as well as to the facility with which our freezing apparatus may be insulated against loss of refrigeration as indicated in the drawing. The insulation may conveniently extend over all surfaces which are maintained at temperatures below the prevailing atmospheric temperature. This includes the ice block machine 11, the conveyor 10, the heat exchanger 2, freezing chamber 8, and other cooled parts.

Although we have described our invention by reference to a particular embodiment thereof, it will be obvious to any one skilled in the art of refrigeration that this design may be modified in many less essential respects. For example, the water and the refrigerant may be introduced into the freezing chamber at separate points or they may be mixed under pressure and sprayed through a single nozzle. The water spray may be produced by any of the well known spray nozzles adapted to the atomization of high pressure liquids. The refrigerant stream may be controlled by a needle type valve rather than the restricted nozzle and valve as indicated.

We may also employ our process for the freezing of fruit juices, orange and grape juice, and other foodstuffs desired in frozen form with a uniform, homogeneous texture and free from segregated ice crystals. Our invention is intended to include these obvious modifications and is not limited except as defined in the following claims:

I claim:

1. The process of manufacturing ice comprising spraying water and a volatile liquid refrigerant into a freezing chamber maintained at a pressure such that the refrigerant completely volatilizes and converts all the water into snow, collecting the snow from the freezing chamber and compressing it into blocks to expel refrigerant vapors.

2. The process according to claim 1, wherein the refrigerant is propane.

3. The process according to claim 1, wherein the refrigerant is butane.

4. The method of uniformly distributing a coloring substance in ice which comprises dissolving the desired color in water, spraying the water into a freezing chamber simultaneously and in close contact with a spray of inert, insoluble liquefied gas whereby the latter is completely vaporized and the water spray is instantly frozen into fine ice resembling snow in which the color is uniformly distributed without segregation, and collecting and compressing the dry snow into solid blocks to expel residual gas.

5. The method of converting a potable water into ice without interfering with its flavor and without causing any segregation of mineral constituents, which comprises spraying the water into a freezing chamber simultaneously and in close contact with a spray of inert, insoluble liquefied gas whereby the latter is completely vaporized and the water spray is instantly frozen into fine ice resembling snow in which the mineral constituents are uniformly distributed and collecting and compressing the dry snow into solid blocks to expel residual gas.

VANDERVEER VOORHEES.
HAROLD V. ATWELL.